July 16, 1940.   W. J. HATTON   2,208,073
COASTER BRAKE
Filed June 27, 1938
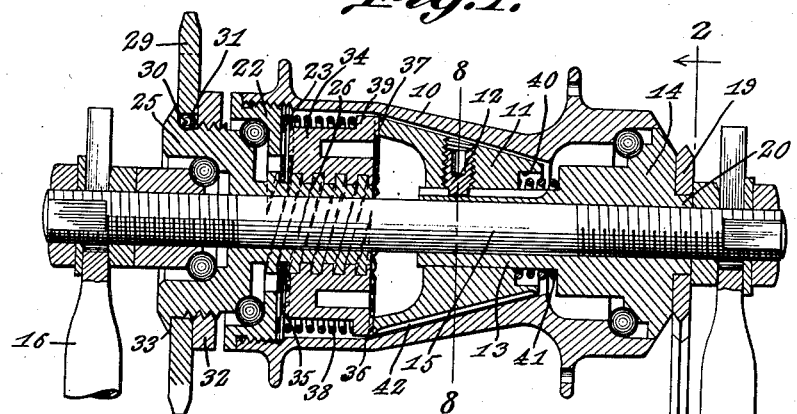
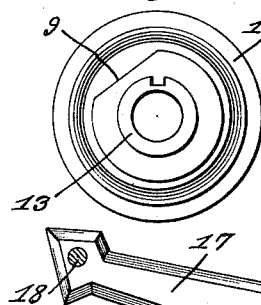
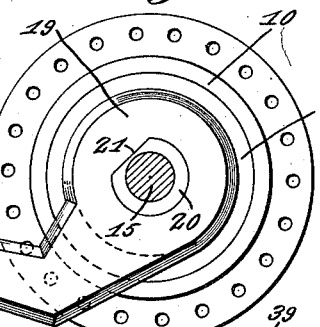
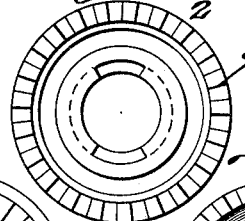
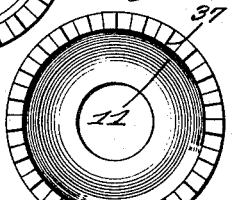
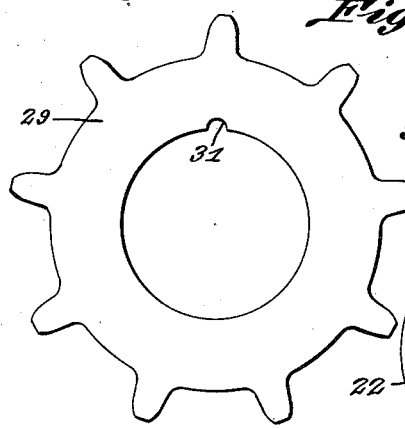
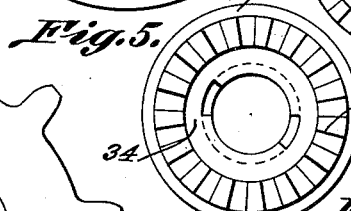
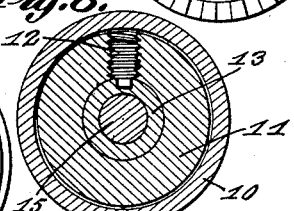
Willard J. Hatton,
INVENTOR
BY Victor J. Evans & Co.
ATTORNEYS Patented July 16, 1940

2,208,073

UNITED STATES PATENT OFFICE 2,208,073

COASTER BRAKE

Willard J. Hatton, Columbus, Ohio

Application June 27, 1938, Serial No. 216,132

1 Claim. (Cl. 192—6)

This invention relates to coaster brakes and has for an object to provide a coaster brake in which the bearing case is provided at its inner face with ratchet teeth and the clutch ring is provided with cooperating teeth, there being an equalizing spring surrounding the clutch ring and bearing at one end against the bearing case and at its other end against the radial flange and clutch ring, to promote a more positive acting coaster brake than conventional coaster brakes.

A further object of the invention is to provide a coaster brake in which the clutch ring does not enter the conical brake member but contacts with the end of said member, there being cooperating teeth on the contacting ends of the clutch ring and conical brake member to promote a quicker application of the brake member than hitherto possible.

A further object is to provide a coaster brake in which the sprocket is keyed to the sprocket support thus permitting of the use of a coarser thread and eliminating the conventional construction of the sprocket driving the sprocket support through a thread, which tends to become stripped under severe conditions of service.

A further object is to provide a coaster brake which will be formed of a few strong simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawing forming part of this specification.

Figure 1 is a longitudinal central section through a hub embodying a coaster brake constructed in accordance with the invention.

Figure 2 is a cross sectional view taken on the line 2—2 of Figure 1 and showing the lock arm and cone, both having flat contact surfaces to hold the cone stationary.

Figure 3 is a side elevation of the sprocket showing the recesses for the ball key.

Figure 4 is a side elevation of the bearing case looking toward the toothed face thereof and showing the same having a flat surface in the central opening by means of which the bearing case may be screwed into place using the cone as a wrench.

Figure 5 is a side elevation of the clutch ring looking toward the toothed face thereof which contacts with the toothed face of the bearing case.

Figure 6 is a side elevation of the opposite face of the clutch ring showing the teeth which coact with the teeth of the conical brake member.

Figure 7 is a side elevation of the concial brake member showing the toothed face which coacts with the toothed face of the clutch ring.

Figure 8 is a cross sectional view of the coaster brake taken on the line 8—8 of Figure 1 and showing the conical brake member splined on the sleeve of the cone.

Figure 9 is a side elevation of the cone and showing the flat wrench surface thereof.

Referring now to the drawing in which like characters of reference designate similar parts in the various views, 10 designates a tapered hub in which is mounted a conical brake member 11 which is splined by a screw 12 on the sleeve 13 of the cone 14. The spindle 15 passes axially through the hub and is supported at its ends in the forks of the rear frame members 16. The cone 14 is screw threadedly engaged upon the spindle and is held rigidly thereon by a lock arm 17 which is bolted at one end to one of the frame members, as shown at 18. At the opposite end the lock arm is provided with a disc head 19 which is provided with an opening to receive a boss 20 on the cone, both the boss and the opening in the disc head being provided with coacting flat surfaces 21 which prevent rotation of the cone in the disc head.

A bearing case 22 is screw threadedly engaged with the hub 10 and is provided on its inner face with teeth 23. As best shown in Figure 4 the axial opening in the bearing case is provided with a flat surface 24. A similar flat surface 9 formed on the cone 14 may be engaged with the flat surface 24 of the bearing case to screw the bearing case into place in the hub.

The driving and operating member comprises a sprocket support 25 having an inner screw threaded sleeve 26. A sprocket 29 is fixed to the sprocket support by means of a key 30 disposed in openings 31 in the sprocket and in the support. A lock ring 32 is screw threadedly engaged with the sprocket support and binds the sprocket against the outer shoulder 33 of the sprocket support. By thus keying the sprocket to the sprocket support the conventional fine threads are eliminated and the screw thread connection between the lock ring and the sprocket support may be made much coarser than is conventional thus adding strength to these parts and eliminating driving of the sprocket support through a thread which is apt to become stripped under severe conditions of service.

The conical brake member 11 is shifted into braking contact with the conical hub by a clutch ring 34, which is internally screw threaded to engage the screw threads of the threaded sleeve 26 of the driving member 25. The clutch ring is provided on one face with teeth 35 to engage with the beforementioned teeth 23 of the bearing case and is provided on the opposite face with teeth 36 to engage with similar teeth 37 formed on the confronting face of the conical brake member 11. An equalizing spring 38 surrounds the outer periphery of the clutch ring for substantially the entire width of the clutch ring, and bears at one end against the bearing case 22 and at its other end bears against a radial flange 39 formed on the clutch ring. It will be pointed out that the clutch ring does not enter the conical brake member as is conventional but contacts with the end of the brake member.

The conical brake member 11 is provided with a recess 40 opposite its toothed face to receive a spiral spring 41 which bears against the cone 14 and normally holds the brake member disengaged from the hub.

The conical brake member 11 is provided with a longitudinal slot 42 to receive grease for lubricating the friction surfaces of the brake member and the hub sufficiently to prevent gaulding of these surfaces.

In operation back pedaling or reverse movement of the sprocket support causes the screw threaded sleeve 26 to move the clutch ring 34 into contact with the splined conical brake member 11 and force said brake member into contact with the wheel hub 10. The meshing teeth 36 and 37 of the clutch ring and conical brake member provide a positive non-slipping connection between these parts so that the brake action is quicker than is conventional. When the back pedaling pressure is released and pedaling forwardly commenced, the springs 41 and 38 move the conical brake member and clutch ring to initial position. In coasting, the driving mechanism remains stationary and the hub revolves independently on the cones 14 and 43.

From the above description it is thought that the construction and operation of the invention will be fully understood without further explanation.

What is claimed is:

In a coaster brake, the combination of a spindle, a wheel hub, a sprocket support forming a driver and having an integral threaded sleeve projecting within the hub, a ball bearing case threadedly engaged with the hub and having ratchet teeth, a clutch ring within the hub having threads engaging the threads of said sleeve to be moved longitudinally of the spindle into brake applying position during back pedaling, said ring having ratchet teeth engaging the ratchet teeth of the bearing case during front pedaling, a flange on the clutch ring, an equalizing spring sleeved on the outer periphery of the clutch ring for substantially the entire width of the clutch ring and bearing against said flange at one end and at the opposite end bearing against said bearing case, a conical brake member abutting one face of the clutch ring and adapted to be moved by lateral movement of the clutch ring into braking position, a cone on said spindle having a longitudinally slotted sleeve, a screw engaged radially through the brake member and entering the slot in the sleeve to spline the brake member on the sleeve, and a helical spring sleeved on the slotted sleeve of the cone and bearing against the cone and the brake member to return the brake member to neutral position after each application.

WILLARD J. HATTON.